United States Patent
Yang et al.

(10) Patent No.: US 9,482,191 B2
(45) Date of Patent: Nov. 1, 2016

(54) SYSTEM AND METHODS FOR MANAGING FUEL TANK TEMPERATURE

(71) Applicant: Ford Global Technologies, LLC, Dearborn, MI (US)

(72) Inventors: Dennis Seung-Man Yang, Canton, MI (US); Aed M Dudar, Canton, MI (US); Russell Randall Pearce, Ann Arbor, MI (US); Shahid Ahmed Siddiqui, Northville, MI (US)

(73) Assignee: Ford Global Technologies, LLC, Deaborn, MI (US)

( * ) Notice: Subject to any disclaimer, the term of this patent is extended or adjusted under 35 U.S.C. 154(b) by 373 days.

(21) Appl. No.: 14/290,725

(22) Filed: May 29, 2014

(65) Prior Publication Data
US 2015/0345436 A1    Dec. 3, 2015

(51) Int. Cl.
*F02M 25/08* (2006.01)
*F02M 31/20* (2006.01)

(52) U.S. Cl.
CPC ..... *F02M 25/0854* (2013.01); *F02M 25/0809* (2013.01); *F02M 31/20* (2013.01); *F02M 2025/0881* (2013.01); *Y02T 10/126* (2013.01)

(58) Field of Classification Search
CPC .. F02M 25/0854; F02M 25/08; F02M 31/20; F02M 2025/0881; Y02T 10/126
See application file for complete search history.

(56) References Cited

U.S. PATENT DOCUMENTS

| | | | |
|---|---|---|---|
| 4,572,394 A * | 2/1986 | Tanahashi | B60K 15/03504 220/746 |
| 5,636,668 A * | 6/1997 | Thompson | B60K 15/03504 123/41.31 |
| 5,861,050 A | 1/1999 | Pittel et al. | |
| 6,230,693 B1 | 5/2001 | Meiller et al. | |
| 6,439,277 B1 | 8/2002 | Kyburz | |
| 6,689,196 B2 | 2/2004 | Amano et al. | |
| 6,698,403 B2 | 3/2004 | Honda et al. | |
| 7,444,996 B2 | 11/2008 | Potier | |
| 7,488,376 B2 | 2/2009 | Kim et al. | |
| 7,513,244 B2 | 4/2009 | Potier | |
| 7,543,574 B2 | 6/2009 | Yamazaki et al. | |
| 7,600,506 B2 | 10/2009 | Kopinsky | |
| 7,615,108 B2 | 11/2009 | Yoshida et al. | |

(Continued)

FOREIGN PATENT DOCUMENTS

WO    2012150397 A2    11/2012

OTHER PUBLICATIONS

Byer, T.G., "Analysis of 2010 Asian Toyota Prius Canister," MeadWestvaco Corporation, Covington, Va, Jul. 28, 2009, 6 pages.

(Continued)

*Primary Examiner* — Hung Q Nguyen
*Assistant Examiner* — Brian P Monahon
(74) *Attorney, Agent, or Firm* — James Dottavio; Alleman Hall McCoy Russell & Tuttle LLP

(57) ABSTRACT

A system for an engine, comprising: a fuel tank; a thermal regulator comprising a phase-change material, the thermal regulator coupled to the fuel tank; and an engine coolant passage positioned to transfer thermal energy between engine coolant and the phase-change material. In this way, the temperature of the fuel tank may be managed passively by the phase-change material, and actively by engine coolant, thereby allowing heat energy to be shunted away from the fuel tank, cooling the fuel within the fuel tank, and reducing fuel vapor concentration, thus enabling a fuel vapor canister with a reduced size.

20 Claims, 8 Drawing Sheets

(56) References Cited

U.S. PATENT DOCUMENTS

| | | |
|---|---|---|
| 7,757,727 B2 | 7/2010 | Handa |
| 7,841,321 B2 | 11/2010 | Kosugi et al. |
| 7,909,919 B2 | 3/2011 | Kosugi et al. |
| 8,105,426 B2 | 1/2012 | Kosugi et al. |
| 8,617,299 B2 | 12/2013 | Hasegawa et al. |
| 2004/0231829 A1* | 11/2004 | Amano ............ B60K 15/03504 165/104.12 |
| 2009/0229580 A1* | 9/2009 | Kopinsky .............. B60K 15/03 123/519 |
| 2011/0203947 A1* | 8/2011 | Ogawa ................. F02M 25/089 206/216 |
| 2013/0206115 A1 | 8/2013 | Kragh |

OTHER PUBLICATIONS

Yang, Dennis Seung-Man et al., "System and Methods for Managing Fuel Vapor Canister Temperature," U.S. Appl. No. 14/290,565, filed May 29, 2014, 38 pages.

* cited by examiner

SYSTEM AND METHODS FOR MANAGING FUEL TANK TEMPERATURE

BACKGROUND AND SUMMARY

Vehicle emission control systems may be configured to store fuel vapors from fuel tank refueling and diurnal engine operations in a fuel vapor canister, and then purge the stored vapors during a subsequent engine operation. The stored vapors may be routed to engine intake for combustion, further improving fuel economy.

However, engine run time in hybrid vehicles (HEVs) may be limited, thus limiting engine manifold vacuum, which is typically used to draw fresh air through the fuel vapor canister to desorb the stored fuel vapors. Rather than continuously routing fuel tank vapors to the fuel vapor canister, the fuel tank may be coupled to a fuel tank isolation valve (FTIV) which may trap fuel vapor within the fuel tank, releasing the fuel vapor to the canister only prior to and during refueling events. In this way, bleed emissions can be reduced, as the resting fuel vapor canister load can be minimized.

However, by sealing the fuel tank, fuel vapor concentrations will increase as the fuel temperature increases. This may be due to increases in ambient temperature (e.g. over a diurnal cycle) and/or due to heat rejected to the fuel tank from the engine and exhaust system during engine operations. As a result, when the tank is vented to the vapor canister prior to refueling, the fuel vapor may saturate the canister to the point where fuel vapors from refueling cannot all be adsorbed within the canister. This may lead to an increase in bleed emissions, and may also lead to uncontrolled amounts of fuel vapor reaching the engine during a canister purge, potentially deviating the engine intake from commanded A/F ratio.

The inventors herein have recognized the above issues, and have developed systems and methods to at least partially address them. In one example, a system for an engine, comprising: a fuel tank; a thermal regulator comprising a phase-change material, the thermal regulator coupled to the fuel tank; and an engine coolant passage positioned to transfer thermal energy between engine coolant and the phase-change material. In this way, the temperature of the fuel tank may be managed passively by the phase-change material, and actively by engine coolant, thereby allowing heat energy to be shunted away from the fuel tank, cooling the fuel within the fuel tank, and reducing fuel vapor concentration, thus enabling the utilization of a fuel vapor canister with a reduced size.

In another example, a method for a vehicle, comprising: during a first condition, circulating engine coolant through a thermal regulator comprising a phase-change material, the thermal regulator coupled to a fuel tank. The first condition may comprise: an engine-on condition; and an ambient temperature above a first threshold. In this way, the phase-change material adsorbs heat from the fuel tank up to the phase-change temperature. Then, by circulating engine coolant through the thermal regulator, additional heat energy can be shunted away from the fuel tank. During operating conditions where a large amount of heat energy is rejected to the fuel tank, the fuel tank temperature may be stabilized, thus managing the fuel vapor concentration and fuel tank pressure.

In yet another example, a method for a vehicle, comprising: during a first condition, circulating engine coolant through a thermal regulator comprising a phase-change material, the thermal regulator coupled to a fuel tank; and then opening a fuel tank isolation valve. In this way, the fuel vapor concentration within a fuel tank may be reduced prior to a refueling event, decreasing the possibility of overwhelming the fuel vapor canister during depressurization, which may otherwise lead to an increase of bleed emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows a cooling system for a vehicle.

FIG. 2 schematically shows a fuel system and emissions system for a vehicle engine.

FIG. 3 schematically shows an example system for managing the temperature of a fuel tank.

Figure 6:
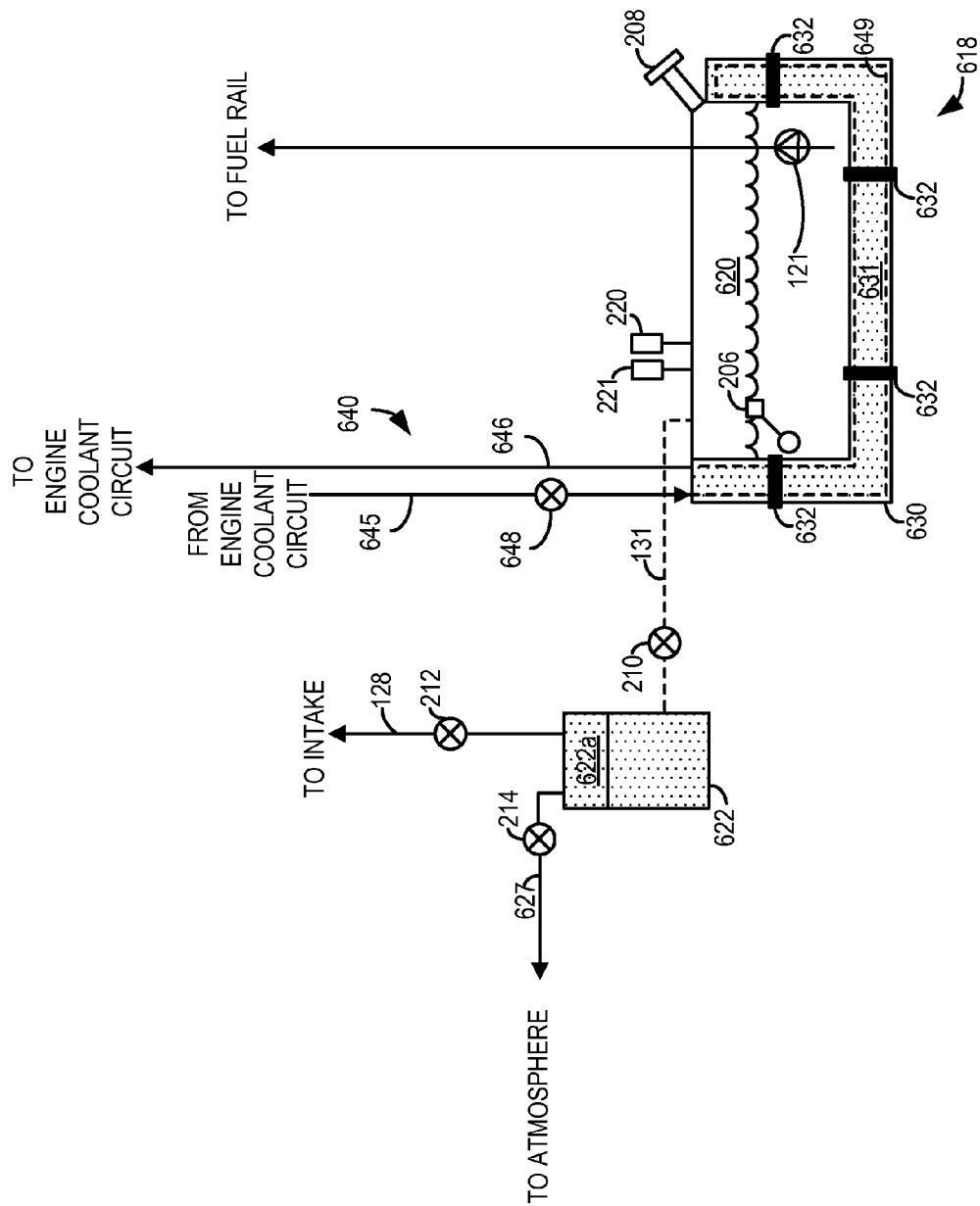

FIG. 6 schematically shows an example system for managing the temperature of a fuel tank.

Figure 7:
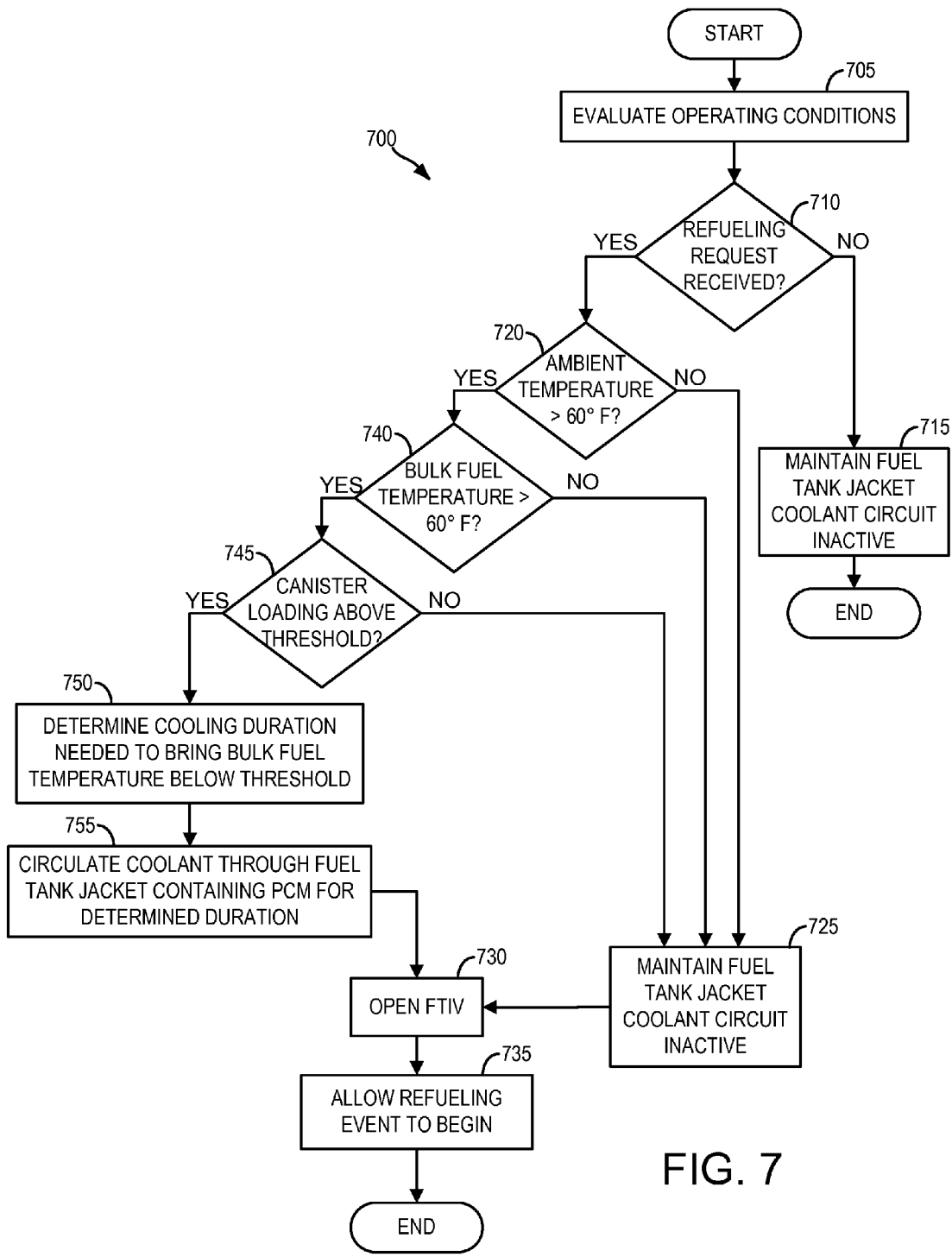

FIG. 7 shows a flow chart for a high level method for controlling fuel tank temperature during a refueling event using the system depicted in FIG. 6.

Figure 8:
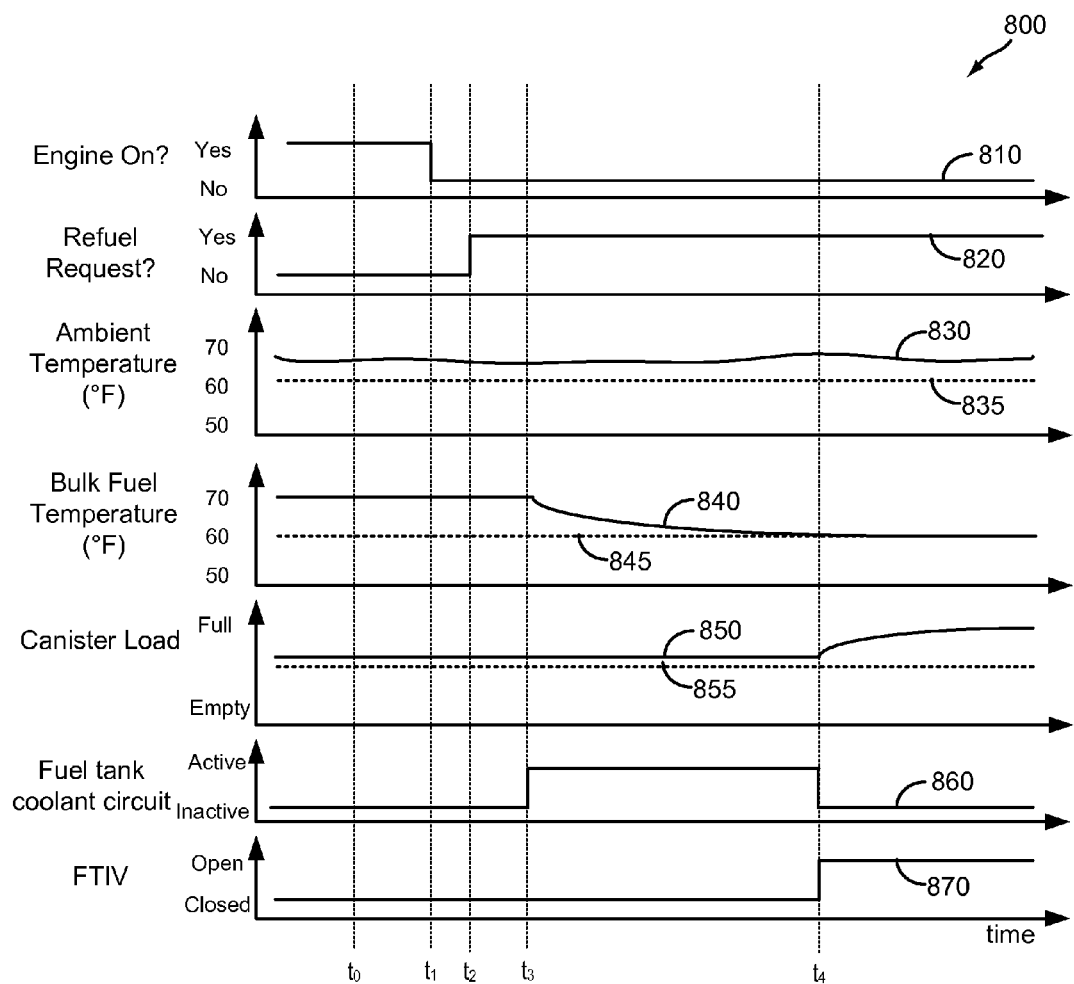

FIG. 8 shows an example timeline for a refueling event using the method shown in FIG. 7.

DETAILED DESCRIPTION

Figure 3:
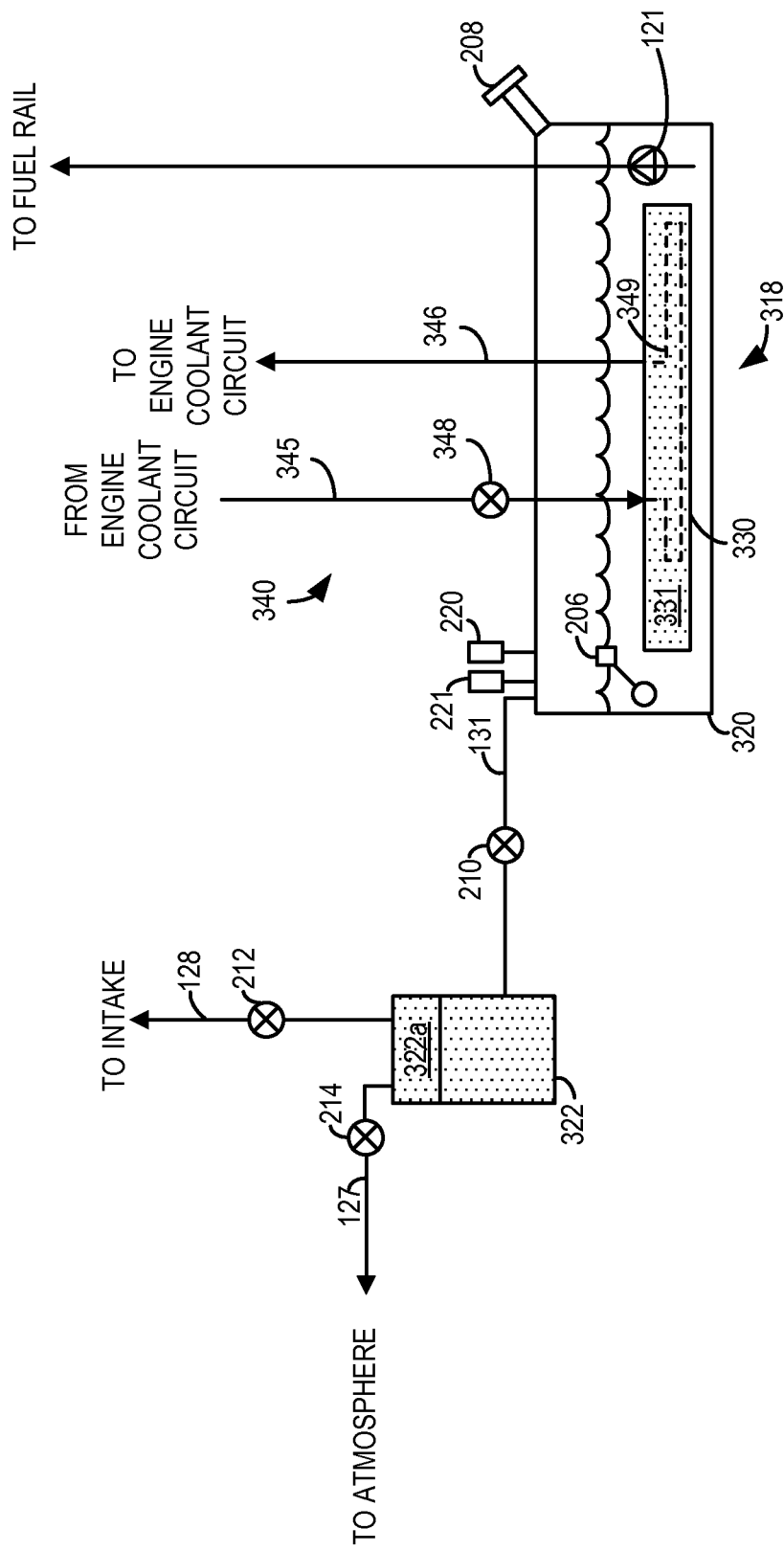
Figure 4:
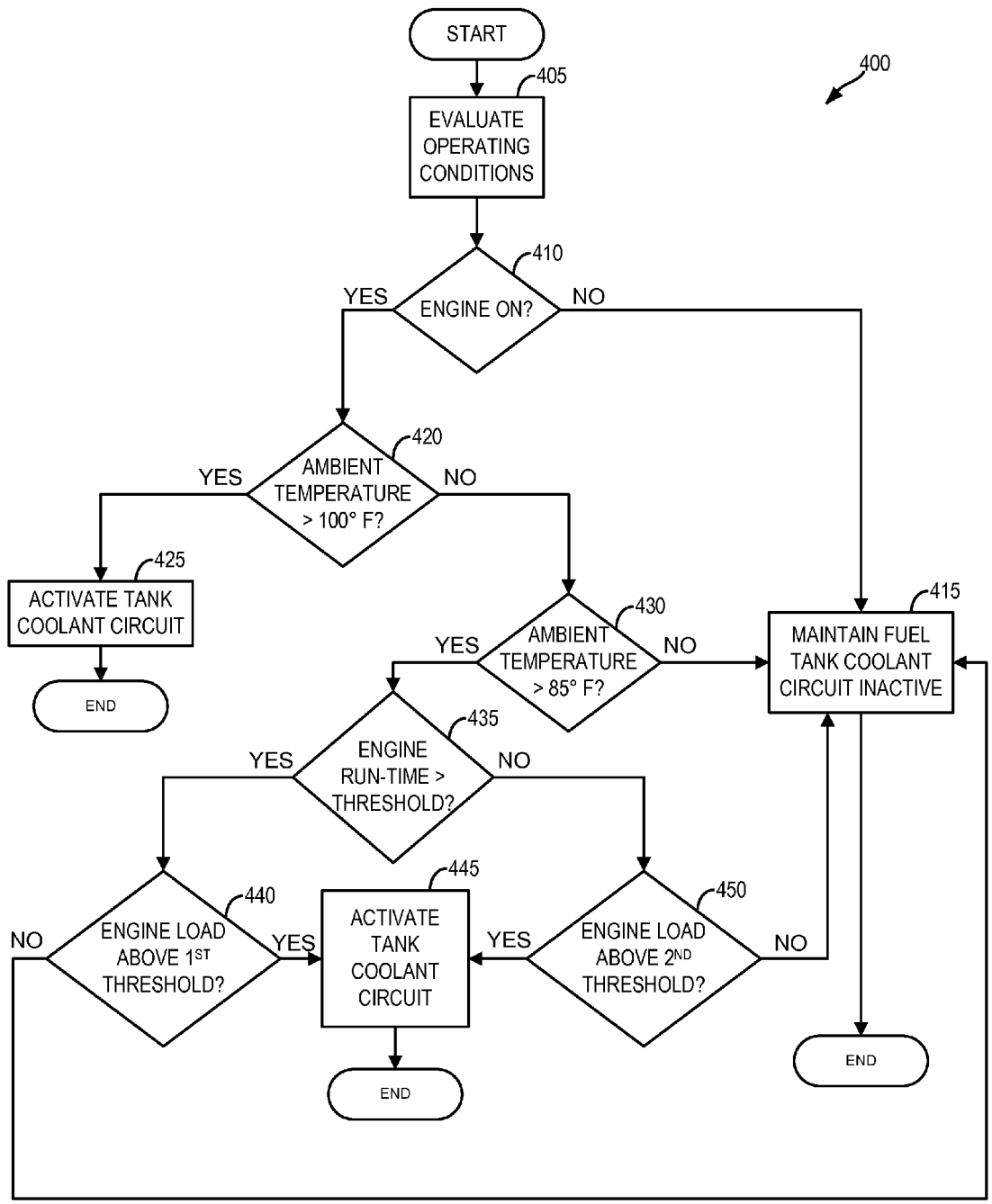
FIG. 4 shows a flow chart for a high level method for controlling fuel tank pressure using the systems depicted in FIG. 3.
Figure 5:
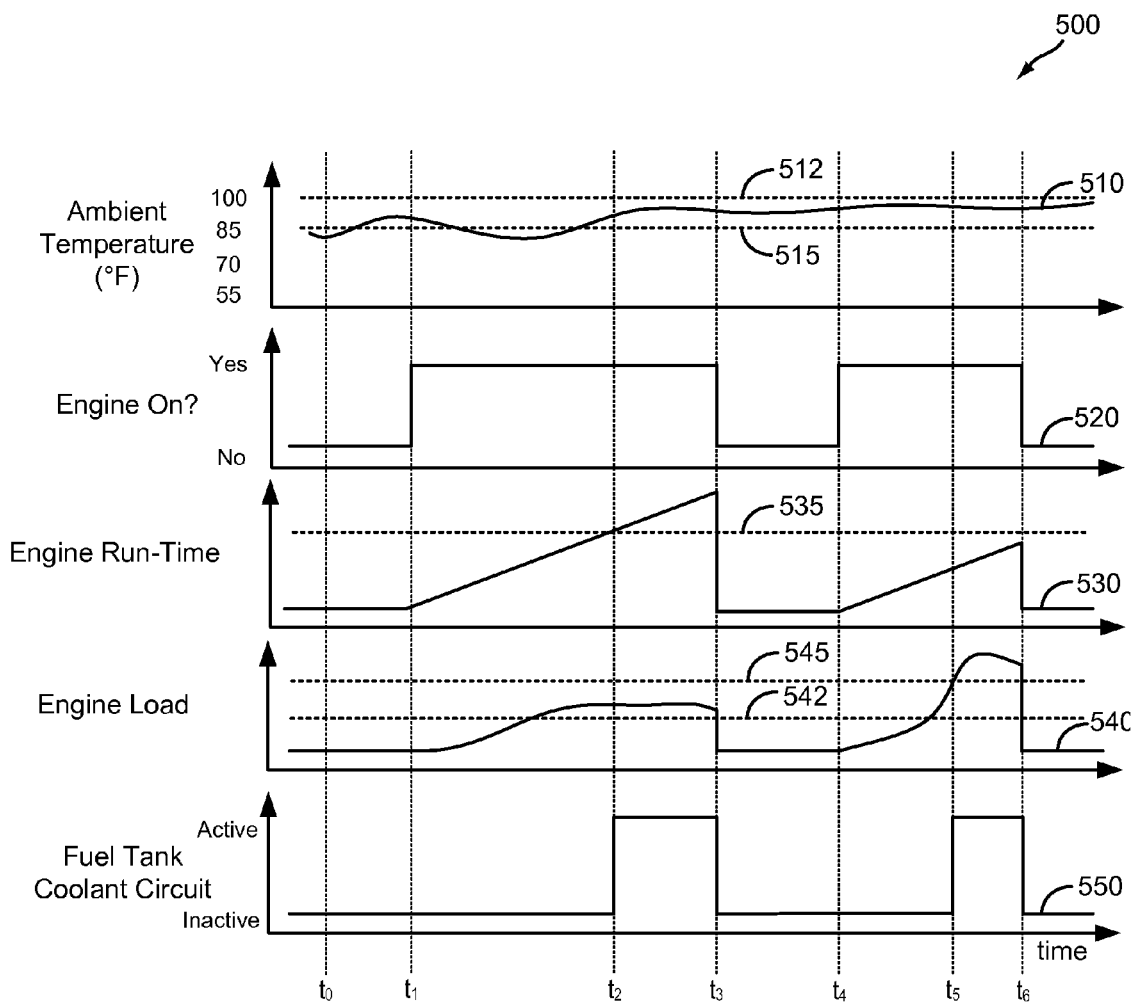
FIG. 5 shows an example timeline for controlling fuel tank pressure using the method shown in FIG. 4.

This detailed description relates to systems and methods for managing the temperature of a fuel tank in a hybrid vehicle. In particular, the description relates to systems and methods for reducing the amount of fuel vapor in a fuel tank by cooling the fuel tank prior to venting the tank to a fuel vapor canister. A hybrid vehicle may be configured with a cooling system, such as the example cooling system depicted in FIG. 1. The cooling system may operate to manage the temperature of a vehicle engine, such as the vehicle engine shown in FIG. 2. The vehicle engine may be coupled to a fuel system, including a fuel tank coupled to a fuel vapor canister via a fuel tank isolation valve (FTIV). The FTIV may be a default-closed valve, such that the fuel tank is isolated except prior to and during refueling events. In this configuration, the vapor pressure within the fuel tank may increase as the fuel temperature increases, due to ambient temperature changes (such as during a diurnal cycle) or due to heat rejected to the fuel tank during engine operations. Accordingly, the fuel tank may be equipped with a thermal regulator comprising a phase change material (PCM), and coupled to the vehicle cooling system. FIG. 3 shows one example of a fuel tank thermal regulator in the form of an in-tank heat exchanger. FIG. 4 shows an example method of managing fuel tank temperature using the thermal regulator shown in FIG. 3. FIG. 5 shows an example timeline for engine operation using the method of FIG. 4. FIG. 6 shows an alternate configuration for a thermal regulator in the form of a fuel tank jacket comprising a PCM, and coupled to the vehicle cooling system. The fuel tank jacket may be used to manage fuel tank temperature prior to a refueling event, for example using the method depicted in FIG. 7. FIG. 8 shows an example timeline for a refueling event using the method of FIG. 7.

Figure 1:
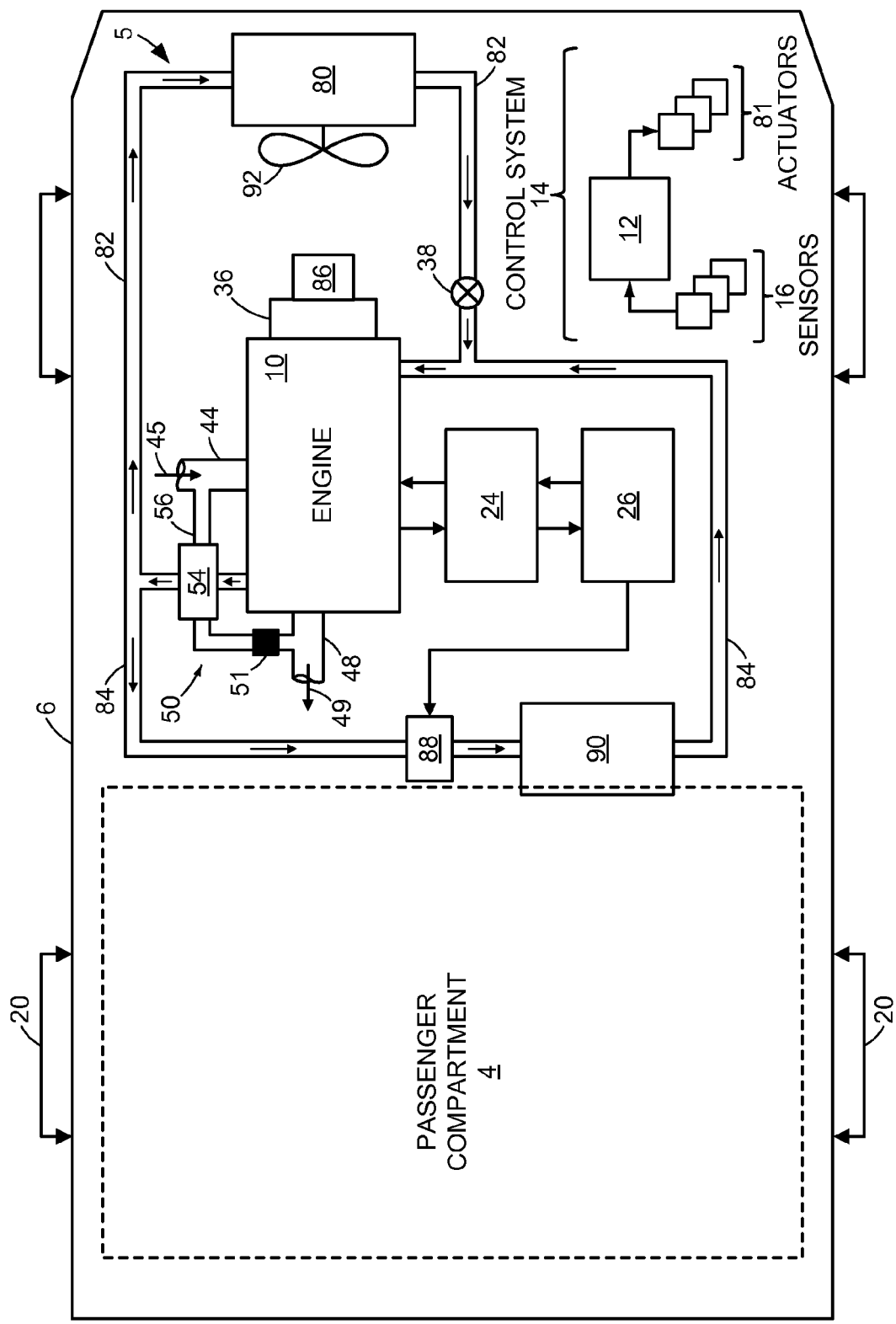

FIG. 1 shows an example embodiment of a cooling system 5 in a motor vehicle 6 is illustrated schematically. Cooling system 5 circulates coolant through internal combustion engine 10 and exhaust gas recirculation (EGR) cooler 54 to absorb waste heat and distributes the heated coolant to radiator 80 and/or heater core 90 via coolant lines 82 and 84, respectively.

In particular, FIG. 1 shows cooling system 100 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which may be directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 6 is moving slowly or stopped while the engine is running. In some examples, fan speed may be controlled by controller 12. Alternatively, fan 92 may be coupled to engine-driven water pump 86.

As shown in FIG. 1, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80.

After passing through EGR cooler 54, coolant may flow through coolant line 82, as described above, and/or through coolant line 84 to heater core 90 where the heat may be transferred to passenger compartment 4, and the coolant flows back to engine 10. In some examples, engine-driven pump 86 may operate to circulate the coolant through both coolant lines 82 and 84. In other examples, such as the example of FIG. 2 in which vehicle 102 has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running, as will be described in further detail below. Like engine-driven pump 86, auxiliary pump 88 may be a centrifugal pump; however, the pressure (and resulting flow) produced by pump 88 may be proportional to an amount of power supplied to the pump by energy storage device 26.

In this example embodiment, the hybrid propulsion system includes an energy conversion device 24, which may include a motor, a generator, among others and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 20, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12 (described below).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 20. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

Figure 2:
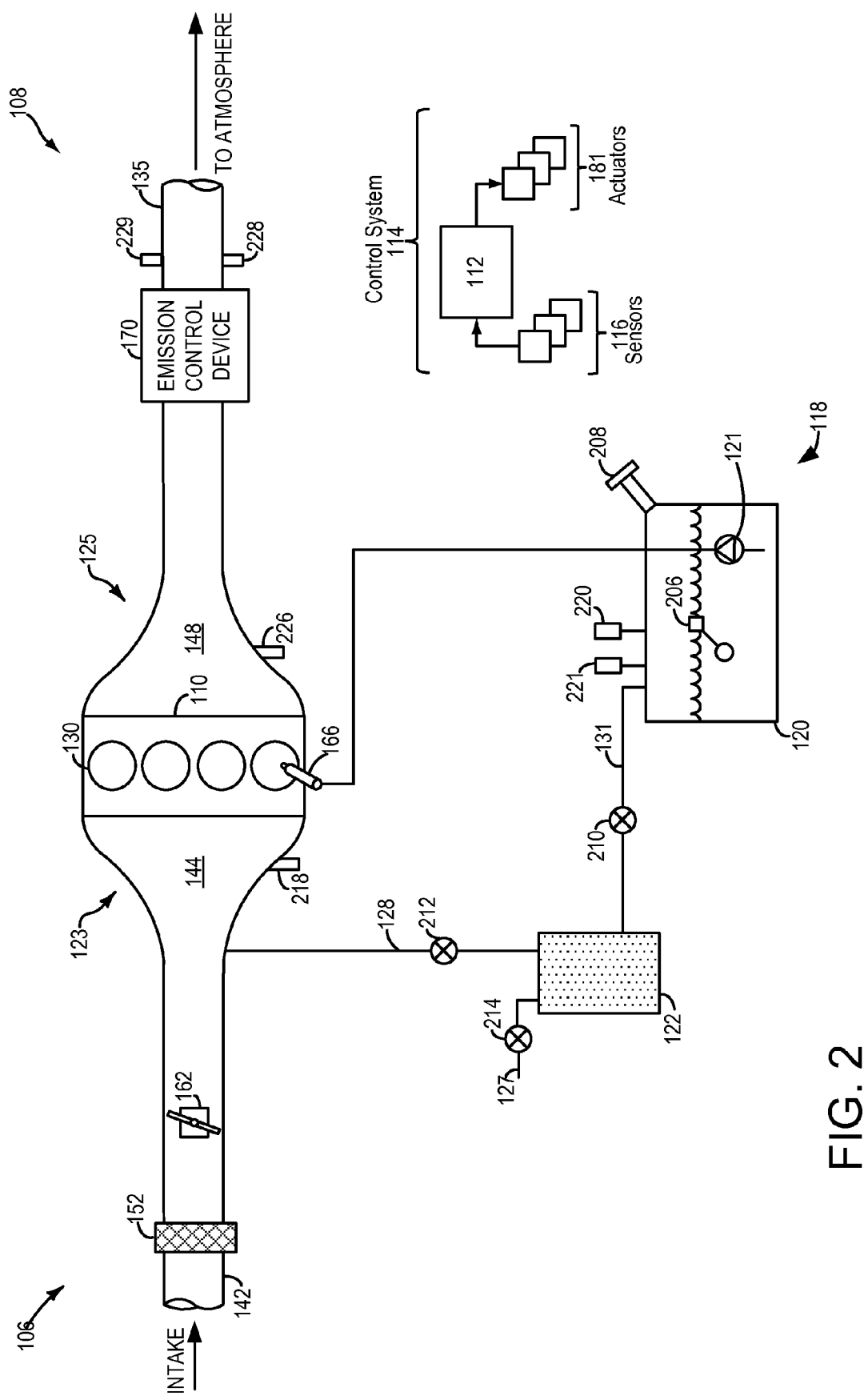

FIG. 2 shows a schematic depiction of a hybrid vehicle system 106 that can derive propulsion power from engine system 108 and/or an on-board energy storage device, such as a battery system. An energy conversion device, such as the energy conversion device shown in FIG. 1, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 108 is coupled to a fuel system 118. Fuel system 118 includes a fuel tank 120 coupled to a fuel pump 121 and a fuel vapor canister 122. During a fuel tank refueling event, fuel may be pumped into the vehicle from an external source through refueling port 208. Fuel tank 120 may hold a plurality of fuel blends, including fuel with a range of alcohol concentrations, such as various gasoline-ethanol blends, including E10, E85, gasoline, etc., and combinations thereof. A fuel level sensor 206 located in fuel tank 120 may provide an indication of the fuel level ("Fuel Level Input") to controller 112. As depicted, fuel level sensor 206 may comprise a float connected to a variable resistor. Alternatively, other types of fuel level sensors may be used.

Fuel pump 121 is configured to pressurize fuel delivered to the injectors of engine 110, such as example injector 166. While only a single injector 166 is shown, additional injectors are provided for each cylinder. It will be appreciated that fuel system 118 may be a return-less fuel system, a return fuel system, or various other types of fuel system. Vapors generated in fuel tank 120 may be routed to fuel vapor canister 122, via conduit 131, before being purged to the engine intake 123.

Fuel vapor canister 122 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 122 may be purged to engine intake 123 by opening canister purge valve 212. While a single canister 122 is shown, it will be appreciated that fuel system 118 may include any number of canisters. In one example, canister purge valve 212 may be a solenoid valve wherein opening or closing of the valve is performed via actuation of a canister purge solenoid.

Canister 122 may include a buffer 122a (or buffer region), each of the canister and the buffer comprising the adsorbent. As shown, the volume of buffer 122a may be smaller than (e.g., a fraction of) the volume of canister 122. The adsorbent in the buffer 122a may be same as, or different from, the adsorbent in the canister (e.g., both may include charcoal). Buffer 122a may be positioned within canister 122 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 122 includes a vent 127 for routing gases out of the canister 122 to the atmosphere when storing, or trapping, fuel vapors from fuel tank 120. Vent 127 may also allow fresh air to be drawn into fuel vapor canister 122 when purging stored fuel vapors to engine intake 123 via purge line 128 and purge valve 212. While this example shows vent 127 communicating with fresh, unheated air, various modifications may also be used. Vent 127 may include a canister vent valve 214 to adjust a flow of air and vapors between canister 122 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 214 may be a solenoid valve wherein opening or closing of the valve is performed via actuation of a canister vent solenoid. In particular, the canister vent valve may be an open that is closed upon actuation of the canister vent solenoid.

As such, hybrid vehicle system 106 may have reduced engine operation times due to the vehicle being powered by engine system 108 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 210 may be optionally included in conduit 131 such that fuel tank 120 is coupled to canister 122 via the valve. During regular engine operation, isolation valve 210 may be kept closed to limit the amount of diurnal or "running loss" vapors directed to canister 122 from fuel tank 120. During refueling operations, and selected purging conditions, isolation valve 210 may be temporarily opened, e.g., for a duration, to direct fuel vapors from the fuel tank 120 to canister 122. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 210 positioned along conduit 131, in alternate embodiments, the isolation valve may be mounted on fuel tank 120.

One or more pressure sensors 220 may be coupled to fuel system 118 for providing an estimate of a fuel system pressure. In one example, the fuel system pressure is a fuel tank pressure, wherein pressure sensor 220 is a fuel tank pressure sensor coupled to fuel tank 120 for estimating a fuel tank pressure or vacuum level. While the depicted example shows pressure sensor 220 directly coupled to fuel tank 120, in alternate embodiments, the pressure sensor may be coupled between the fuel tank and canister 122, specifically between the fuel tank and isolation valve 210. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 221 may also be coupled to fuel system 118 for providing an estimate of a fuel system temperature. In one example, the fuel system temperature is a fuel tank temperature, wherein temperature sensor 221 is a fuel tank temperature sensor coupled to fuel tank 120 for estimating a fuel tank temperature. While the depicted example shows temperature sensor 221 directly coupled to fuel tank 120, in alternate embodiments, the temperature sensor may be coupled between the fuel tank and canister 122.

Fuel vapors released from canister 122, for example during a purging operation, may be directed into engine intake manifold 144 via purge line 128. The flow of vapors along purge line 128 may be regulated by canister purge valve 212, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 128 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 218 coupled to intake manifold 144, and communicated with controller 112. Alternatively, MAP may be inferred from alternate engine operating conditions, such as mass air flow (MAF), as measured by a MAF sensor (not shown) coupled to the intake manifold.

Fuel system 118 may be operated by controller 112 in a plurality of modes by selective adjustment of the various valves and solenoids. For example, the fuel system may be operated in a fuel vapor storage mode (e.g., during a fuel tank refueling operation and with the engine not running), wherein the controller 112 may open isolation valve 210 and canister vent valve 214 while closing canister purge valve (CPV) 212 to direct refueling vapors into canister 122 while preventing fuel vapors from being directed into the intake manifold.

As another example, the fuel system may be operated in a refueling mode (e.g., when fuel tank refueling is requested by a vehicle operator), wherein the controller 112 may open isolation valve 210 and canister vent valve 214, while maintaining canister purge valve 212 closed, to depressurize the fuel tank before allowing enabling fuel to be added therein. As such, isolation valve 210 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 112 may open canister purge valve 212 and canister vent valve while closing isolation valve 210. Herein, the vacuum generated by the intake manifold of the operating engine may be used to draw fresh air through vent 127 and through fuel vapor canister 122 to purge the stored fuel vapors into intake manifold 144. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 122 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 226 located upstream of the emission control device, temperature sensor 228, MAP sensor 218, pressure sensor 220, and pressure sensor 229. Other sensors such as additional pressure, temperature, air/fuel ratio, and composition sensors may be coupled to various locations in the vehicle system 106. As another example, the actuators may include fuel injector 166, isolation valve 210, purge valve 212, vent valve 214, fuel pump 121, and throttle 162.

Control system 114 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 114 may further be configured to receive information via the internet or other communication networks. Information received from the GPS may be cross-referenced to information available via the internet to determine local weather conditions, local vehicle regulations, etc. Control system 114 may use the internet to obtain updated software modules which may be stored in non-transitory memory.

The control system 114 may include a controller 112. Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 4 and 7.

As isolation valve 210 is normally sealed except during refueling, fuel tank pressure can increase greatly during hot ambient conditions, or when significant amounts of heat are rejected from the fuel tank or exhaust system to the fuel tank. Prior to refueling, the fuel vapor must be vented to canister 122. A high tank pressure, and thus a high volume of fuel vapor, may overwhelm the fuel vapor canister, leaving the canister unable to adsorb all of the fuel vapors generated during refueling. This may result in an increase in emissions, and may further increase the possibility of fuel vapor spikes going to the engine intake. Increasing the size of the fuel vapor canister to deal with a maximum fuel vapor load may add manufacturing costs and require the alteration or movement of other engine components within the engine compartment to accommodate the larger canister. Cooling the fuel tank may reduce the amount of fuel vapors stored in the tank, allowing for the fuel vapor canister to handle the fuel vapor load during refueling.

FIG. 3 shows an example fuel system 318. Fuel tank 120 may be coupled to fuel vapor canister 322. Canister 322 may include a buffer 322a (or buffer region), each of the canister and the buffer comprising the adsorbent. As shown, the volume of buffer 322a may be smaller than (e.g., a fraction of) the volume of canister 322. The adsorbent in the buffer 322a may be same as, or different from, the adsorbent in the canister (e.g., both may include charcoal). Buffer 322a may be positioned within canister 322 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister.

Canister 322 may receive fuel vapor from fuel tank 120 via conduit 131 upon the opening of FTIV 210. Fuel vapor may be purged from canister 322 to the intake of the vehicle engine via purge line 128 when CPV 212 is opened, and when CVV 214 is opened, drawing atmospheric air through vent line 327. Further, if CVV 214 is opened while fuel vapor is being vented from fuel tank 120 to canister 322, air stripped of fuel vapor may be vented to atmosphere.

Fuel tank 320 may include thermal regulator 330. In this example, thermal regulator 330 is configured as a heat exchanger disposed within fuel tank 320 such that liquid fuel stored within the fuel tank may be in contact with the heat exchanger. Thermal regulator 330 may comprise a plurality of fins, holes, or other features which may increase the surface area of the thermal regulator, thereby increasing the contact surface between the liquid fuel and the surface of thermal regulator 330. Thermal regulator 330 may be mounted to the base and/or sides of the interior of fuel tank 320 by bolts, clamps, or by any appropriate means.

Thermal regulator 330 may comprise a phase change material (PCM) 331. A phase change material may be defined as a chemical formulation that undergoes a phase transition from a first phase to a second phase at a phase transition temperature (PTT) inherent to the material. Typically, this phase transition is between a solid phase and a liquid phase. The PCM absorbs a quantity of heat (known as a fusion energy) while in the first phase. By placing the PCM in a heat transfer relationship with an object, the PCM may absorb heat as the object increases in temperature, thus maintaining the temperature of the object.

Many different PCMs are known in the art, such as paraffin, polyethylene glycols, lithium nitrate trihydrate, and various organic and inorganic compounds. The chemical composition of the PCM determines the PTT and fusion energy of the PCM. As such, an appropriate PCM may be chosen to fill thermal regulator 330 based on the size of the fuel tank, type of fuel contained within the fuel tank, etc. In other words, the composition and quantity of PCM 331 within thermal regulator 330 may be selected to match the amount of heat absorption necessary to maintain a fuel tank pressure below a threshold. PCM 331 may be stored in bulk within thermal regulator 330, or may be embedded in granules. The PCM may be distributed evenly throughout thermal regulator 330, or may be distributed based on the profile and configuration of the fuel tank. Thus, as the temperature of fuel within fuel tank 320 increases, the heat may be transferred to the PCM, thereby mitigating the temperature increase of the fuel, maintaining more fuel in the liquid state, thereby reducing the amount of fuel vapor and reducing the fuel tank pressure.

A coolant circuit 340 may be coupled to thermal regulator 330 in order to increase the thermal capacity of the heat exchanger. Coolant circuit 340 may comprise a coolant inlet 345 and a coolant outlet 346. Flow of coolant into thermal regulator 330 may be mediated by coolant valve 348. Coolant valve 348 may be controlled via commands from the vehicle controller 112. In some examples, coolant valve 348 may be a thermostatic valve. Coolant circuit 340 may further comprise thermal loop 349, disposed within thermal regulator 330, and coupled between coolant inlet 345 and coolant outlet 346. Thermal loop 349 may comprise a plurality of conduits enabling heat exchange between the circulating coolant and PCM 331. In some configurations, thermal loop 349 may be at least partially disposed within an outer wall of thermal regulator 330. Coolant circuit 340 may be coupled to an engine cooling circuit at a point in the engine cooling circuit where the coolant is at a minimal temperature. For example, in the cooling system shown in FIG. 1, coolant circuit 340 may be coupled to coolant line 82 downstream of radiator 80, such that coolant leaving to the radiator is supplied to coolant circuit 340 upon the opening of valve 346. Alternatively, coolant circuit 340 may draw coolant from coolant line 84 downstream of heater core 90. Coolant circuit 340 may return heated coolant upstream of radiator 80, so that the coolant heated in thermal regulator 330 may be cooled within the radiator. Coolant circuit 340 may include one or more auxiliary pumps configured to drive coolant through the circuit.

FIG. 4 shows a flow chart for a high level method 400 for managing the temperature of a fuel tank in accordance with the present disclosure. Method 400 will be described in reference to the systems described in FIGS. 1-3, though it should be understood that method 400 may be applied to other systems (including the system depicted in FIG. 6) without departing from the scope of this disclosure. Method 400 may be carried out by a controller, such as controller 112, and may be stored as executable instructions in non-transitory memory.

Method 400 may begin at 405. At 405, method 400 may include evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc. and various ambient conditions, such as temperature, barometric pressure, humidity, etc.

Continuing at 410, method 400 may include determining whether the vehicle engine is on. If the vehicle engine is not on, method 400 may proceed to 415. At 415, method 400 may include maintaining the fuel tank coolant circuit inactive. This may include maintaining valve 346 closed, and may further include maintaining an auxiliary coolant pump coupled to the fuel tank coolant circuit inactive.

If the vehicle engine is on, method 400 may proceed to 420. At 420, method 400 may include determining whether the ambient temperature is greater than 100° F. (38° C.). Ambient temperature may be determined via an ambient temperature sensor, on inferred based on vehicle location (via an on board GPS, for example). Ambient temperatures greater than 100° F. may signify that the fuel temperature is above the phase change temperature for the PCM within the fuel tank thermal regulator. The heat exchanger may thus need to be cooled in order to adsorb additional heat from the stored fuel. The temperature threshold may be different for different PCM compositions. If ambient temperature is greater than 100° F., method 400 may proceed to 425. At 425, method 400 may include activating the fuel tank coolant circuit. Activating the fuel tank coolant circuit may include opening valve 346, and may further include activating an auxiliary coolant pump coupled to the fuel tank coolant circuit.

If the ambient temperature is less than 100° F., method 400 may proceed to 430. At 430, method 400 may include determining whether the ambient temperature is greater than 85° F. (29° C.). If the ambient temperature is not greater than 85° F., method 400 may proceed to 415, and may include maintaining the fuel tank coolant circuit inactive.

If the ambient temperature is greater than 85° F., method 400 may proceed to 435. At 435, method 400 may include determining whether the engine run-time is greater than a threshold. The engine run-time threshold may be predetermined, or may be based on current operating conditions. For example, the engine run-time threshold may be based on the inherent temperature of the engine block as a function of how long the engine has been on. As such, the engine run-time threshold may be based on a heat-rejection profile of the engine which may, in turn, influence a temperature of the fuel tank.

If the engine run-time is above the threshold, method 400 may proceed to 440. At 440, method 400 may include determining whether an engine load is greater than a first threshold. The first engine load threshold may be predetermined, or may be based on current operating conditions, such as engine speed. The first engine load threshold may be based on a heat-rejection profile of the engine which may, in turn, influence a temperature of the fuel tank. If the engine load is not greater than the first engine load threshold, method 400 may proceed to 415, and may include maintaining the fuel tank coolant circuit inactive. Method 400 may then end. If the engine load is greater than the first engine load threshold, method 400 may proceed to 445, and may include activating the fuel tank coolant circuit. Method 400 may then end.

Returning to 435, if the engine run-time is determined to be less than the engine run-time threshold, method 400 may proceed to 450. At 450, method 400 may include determining whether an engine load is greater than a second threshold. The second engine load threshold may be predetermined, or may be based on current operating conditions, such as engine speed, and may be based on a heat-rejection profile of the engine. The second engine load threshold may be greater than the first engine load threshold, as a higher engine load may be necessary to increase the engine block temperature above a threshold when the engine run-time is below a threshold. If the engine load is not greater than the second engine load threshold, method 400 may proceed to 415, and may include maintaining the fuel tank coolant circuit inactive. Method 400 may then end. If the engine load is greater than the second engine load threshold, method 400 may proceed to 445, and may include activating the fuel tank coolant circuit. Method 400 may then end.

FIG. 5 shows an example timeline 500 for managing the temperature of a fuel tank using the method described herein and with regard to FIG. 4 as applied to the system described herein and with regard to FIGS. 1-3. Timeline 500 includes plot 510 indicating an ambient temperature over time. Line 512 represents a threshold temperature of 100° F., while line 515 represents a threshold temperature of 85° F. Timeline 500 further includes plot 520, indicating the status of a engine over time. Timeline 500 further includes pot 530, indicating a cumulative engine run-time over time. Line 535 represents an engine run-time threshold. Timeline 500 further includes plot 540, indicating an engine load over time. Line 542 indicates a first engine load threshold, while line 545 indicates a second engine load threshold. Timeline 500 further includes plot 550, indicating the status of a fuel tank coolant circuit over time.

At time $t_0$, the vehicle engine is off, as indicated by plot 520. Thus, no active fuel tank cooling is needed, and the fuel tank coolant circuit is inactive, as shown by plot 550. At time $t_1$, the engine is turned on, as indicated by plot 520. Ambient temperature is above 85° F. as indicated by plot 510. However, as the engine run-time is below the threshold depicted by line 535, the fuel tank coolant circuit would only be activated if the engine load were above the second load threshold indicated by line 545. As shown by plot 540, the engine load is not above the second load threshold. Thus, the fuel tank coolant circuit is maintained inactive, as shown by plot 550.

At time $t_2$, ambient temperature is above 85° F., as shown by plot 510, and the engine run time reaches the engine-run time threshold represented by line 535. The engine load is above the first threshold represented by line 542. As such, the criteria for activating the fuel tank coolant circuit are met, and the fuel tank coolant circuit is activated, as indicated by plot 550. The fuel tank coolant circuit is maintained on from time $t_2$ to time $t_3$, as the ambient temperature and engine load remain above their respective thresholds. At time $t_3$, the vehicle engine is turned off. Accordingly the fuel tank coolant circuit is inactivated.

The engine remains off until time $t_4$. At time $t_4$, the ambient temperature is above 85° F., but the engine load is below the first and second thresholds. Accordingly, the fuel tank coolant circuit is maintained inactive.

From time $t_4$ to time $t_5$, ambient temperature is above 85° F., but the engine run-time is below the run-time threshold. Accordingly, the fuel tank coolant circuit would only be activated if the engine load were above the second load threshold indicated by line 545. The fuel tank coolant circuit is maintained off from time $t_4$ to time $t_5$, as the engine load is below the second load threshold. At time $t_5$, the engine load increases above the second load threshold. As such, the criteria for activating the fuel tank coolant circuit are met, and the fuel tank coolant circuit is activated, as indicated by plot 550. The fuel tank coolant circuit is maintained on from time $t_5$ to time $t_6$, as the ambient temperature and engine load remain above their respective thresholds. At time t₆, the vehicle engine is turned off. Accordingly the fuel tank coolant circuit is inactivated.

FIG. 6 shows an alternative example of a system for managing fuel tank temperature in accordance with the current disclosure. FIG. 6 shows an example fuel system 618. Fuel tank 620 may be coupled to fuel vapor canister 622. Canister 622 may include a buffer 622a (or buffer region), each of the canister and the buffer comprising an adsorbent. Canister 622 may receive fuel vapor from fuel tank 620 via conduit 131 upon the opening of FTIV 210. Fuel vapor may be purged from canister 622 to the intake of the vehicle engine via purge line 128 when CPV 212 is opened and when CVV 214 is opened, drawing atmospheric air through vent line 627. Further, if CVV 214 is opened while fuel vapor is being vented from fuel tank 620 to canister 622, air stripped of fuel vapor may be vented to atmosphere.

Fuel tank 620 may include thermal regulator 630. In this example, thermal regulator 630 is configured as a heat shield coupled to the outside of fuel tank 620. Thermal regulator 630 may be configured to surround all or part of fuel tank 620, and thus may be configured to be adjacent to the outer surface of fuel tank 620. In some examples, thermal regulator 630 may be fabricated as a contiguous part of fuel tank 620, for example, as a fuel tank jacket. Thermal regulator 630 may comprise a phase change material (PCM) 631. An appropriate PCM may be chosen to fill thermal regulator 630 based on the size of the fuel tank. In other words, the composition and quantity of PCM 631 within thermal regulator 630 may be selected to match the amount of heat absorption necessary to maintain a fuel tank pressure below a threshold. PCM 631 may be stored in bulk within thermal regulator 630, or may be embedded in granules. The PCM may be distributed evenly throughout thermal regulator 630, or may be distributed based on the profile and configuration of the fuel tank. Thus, as the temperature of fuel within fuel tank 620 increases, the heat may be transferred to the PCM, thereby mitigating the temperature increase of the fuel, maintaining more fuel in the liquid state, thereby reducing the amount of fuel vapor and reducing the fuel tank pressure. Thermal regulator 630 is shown coupled to fuel tank 620 by a plurality of tank straps 632, but may be coupled to fuel tank 620 by any appropriate means.

A coolant circuit 640 may be coupled to thermal regulator 630 in order to increase the thermal capacity of the heat exchanger. Coolant circuit 640 may comprise a coolant inlet 645 and a coolant outlet 646. Flow of coolant into thermal regulator 630 may be mediated by coolant valve 648. Coolant valve 648 may be controlled via commands from the vehicle controller 112. In some examples, coolant valve 648 may be a thermostatic valve. Coolant circuit 640 may further comprise thermal loop 649, disposed within thermal regulator 630, and coupled between coolant inlet 645 and coolant outlet 646. Thermal loop 649 may comprise a plurality of conduits enabling heat exchange between the circulating coolant and PCM 331. In some configurations, thermal loop 649 may be at least partially disposed within an outer wall of thermal regulator 630. Coolant circuit 640 may be coupled to an engine cooling circuit at a point in the engine cooling circuit where the coolant is at a minimal temperature. For example, in the cooling system shown in FIG. 1, coolant circuit 640 may be coupled to coolant line 82 downstream of radiator 80, such that coolant leaving to the radiator is supplied to coolant circuit 640 upon the opening of valve 646. Alternatively, coolant circuit 640 may draw coolant from coolant line 84 downstream of heater core 90.

Coolant circuit 640 may return heated coolant upstream of radiator 80, so that the coolant heated in thermal regulator 630 may be cooled within the radiator. Coolant circuit 340 may include one or more auxiliary pumps configured to drive coolant through the circuit.

FIG. 7 shows a flow chart for a high level method 700 for a refueling event in accordance with the present disclosure. Method 700 will be described in reference to the systems described in FIGS. 1, 2, and 6, though it should be understood that method 700 may be applied to other systems (including the system depicted in FIG. 3) without departing from the scope of this disclosure. Method 700 may be carried out by a controller, such as controller 112, and may be stored as executable instructions in non-transitory memory.

Method 700 may begin at 705. At 705, method 700 may include evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc. and various ambient conditions, such as temperature, barometric pressure, humidity, etc.

Continuing at 710, method 700 may include determining whether a refueling request has been received. A refueling request may be received directly or indirectly. For example, a direct refueling request may be received from a dash-mounted refueling request button. In some examples, an operator attempting to access a refueling filler neck may constitute a refueling request (e.g. an operator opening a refueling door). Indirect refueling request examples may include a proximity of a vehicle to a refueling station, and/or wireless communication between a vehicle and a refueling pump.

If no refueling request is received, method 700 may proceed to 715. At 715, method 700 may include maintaining the fuel tank jacket coolant circuit inactive. This may include, for example, maintaining coolant valve 646 closed, and may further include maintaining an auxiliary coolant pump coupled to the coolant circuit inactive. Method 700 may then end.

If a refueling request is received, method 700 may proceed to 720. At 720, method 700 may include determining whether the ambient temperature is greater than 60° F. Ambient temperature may be determined via an ambient temperature sensor, on inferred based on vehicle location (via an on board GPS, for example). Ambient temperatures greater than 60° F. may signify that the amount of fuel vapor in the tank is above a threshold amount that can be held by the canister, or that the fuel vapors expected to be generated upon refueling may be above a threshold. The temperature threshold may be different for different PCM compositions.

If the ambient temperature is below 60° F., method 600 may proceed to 725. At 725, method 700 may include maintaining the fuel jacket coolant circuit inactive. Method 700 may then proceed to 730. At 730, method 700 may include opening FTIV 210 and venting fuel vapor into fuel vapor canister 122. Controller 112 may monitor the fuel tank pressure while venting, for example, via pressure measurements derived from a signal from FTPT 220. In some examples, method 700 may include maintaining the FTIV open while restricting access to refueling port 208 until the fuel tank pressure decreases below a threshold. For example, this may include maintaining a refueling door locked, maintaining a fuel cap locked, or maintaining a capless refueling flap in a locked conformation. Continuing at 735, method 700 may include allowing the refueling event to begin. Allowing the refueling event to begin may include allowing access to the refueling port, for example, by unlocking a refueling door. A visual and/or audio cue may be given the operator indicating that refueling may begin. Method 700 may then end.

Returning 720, if the ambient temperature is determined to be below 60° F., method 700 may proceed to 740. At 740, method 700 may include determining whether the bulk fuel temperature is above 60° F. The bulk fuel temperature may be measured, for example, by fuel tank temperature sensor 221, or inferred. The bulk fuel temperature threshold may change based on the type of fuel or other operating parameters. If the bulk fuel temperature is determined to be less than 60° F., method 700 may proceed to 725 and continue as described herein.

If the bulk fuel temperature is determined to be above 60° F., method 700 may proceed to 745. At 745, method 700 my include determining whether a canister load is greater than a threshold. The canister load may be measured or inferred. For example, the quantity of fuel vapor that has entered the canister in the time following the most recent purge event may be determined for each fuel tank venting event via a canister temperature sensor, oxygen sensor, hydrocarbon sensor, etc. The canister load threshold may be based on the amount of fuel in the fuel tank, the ambient temperature, bulk fuel temperature, and/or other operating conditions that may contribute to the amount of fuel vapor expected to enter the canister during the refueling event. In other words, it may be determined if the expected amount of fuel vapor is greater than the current capacity of the fuel vapor canister, based on the current amount of fuel vapor stored in the canister. If the canister load is below the threshold, method 700 may proceed to 725 and continue as described herein.

If the canister load is above the threshold, method 700 may proceed to 750. At 750, method 700 may include determining a cooling duration necessary to bring the bulk fuel temperature below a threshold. By circulating coolant through thermal regulator 630, the bulk fuel temperature may be decreased, thereby decreasing the amount of fuel vapors vented to the fuel vapor canister upon the opening of the FTIV. The bulk fuel temperature threshold may thus be based on the current canister load, fuel type, and other conditions that may determine the amount of fuel vapor that can be accepted by the fuel vapor canister. Based on the bulk fuel temperature, coolant temperature, fuel level, etc., a cooling duration may be determined. The cooling duration represents the amount of time needed to circulate coolant through the heat shield in order for the bulk fuel temperature to decrease below the threshold.

When the cooling duration has been determined, method 700 may proceed to 755. At 755, method 700 may include circulating coolant through the fuel tank heat shield for the cooling duration. This may include opening valve 646, and may further include activating one or more auxiliary coolant pumps coupled within coolant circuit 640. Following the cooling duration, and/or when the bulk fuel temperature has decreased below the threshold, method 700 may proceed to 730 and continue as described herein.

FIG. 8 shows an example timeline 800 for managing the temperature of a fuel tank during a refueling event using the method described herein and with regard to FIG. 7 as applied to the system described herein and with regard to FIGS. 1, 2, and 6. Timeline 800 includes plot 810 indicating the status of a vehicle engine over time. Timeline 800 further includes plot 820, indicating whether a refuel request is detected over time. Timeline 800 further includes plot 830, indicating ambient temperature (in ° F.) over time, while line 835 represents an ambient temperature threshold of 60° F. Timeline 800 further includes plot 840, indicating bulk fuel temperature over time, while line 845 represents a bulk fuel temperature threshold of 60° F. Timeline 800 further includes plot 850, indicating a canister load over time, while line 855 represents a canister load threshold. Timeline 800 further includes plot 860, indicating the status of a fuel tank coolant circuit over time, and plot 870, indicating the status of a fuel tank isolation valve over time.

At time $t_0$, the vehicle engine is on, as shown by plot 810. Accordingly, the fuel tank coolant circuit is maintained inactive, as shown by plot 860, and the FTIV is maintained closed, as shown by plot 870. At time $t_1$, the engine is turned off. The coolant circuit is maintained inactive, and the FTIV is maintained closed.

At time $t_2$, a refueling request is received, as shown by plot 820. The ambient temperature is above the ambient temperature threshold of 60° F., as shown by plot 830, and the bulk fuel temperature is above the bulk fuel temperature threshold of 60° F., as shown by plot 840. Further, the canister load is above the canister load threshold, as shown by plot 850. Together, this data indicates that the fuel tank needs to be cooled in order to reduce the amount of fuel vapor that will be vented to the fuel vapor canister prior to refueling. Accordingly, at time $t_3$, the fuel tank coolant circuit is activated, while the FTIV is maintained closed.

With the fuel tank coolant circuit activated, the bulk fuel temperature begins to decrease at time $t_3$. The fuel tank coolant circuit is maintained active until time $t_4$, when the bulk fuel temperature decreases below the bulk fuel temperature threshold. At time t4, the fuel tank coolant circuit is then inactivated, as shown by plot 860, and the FTIV is opened, as shown by plot 870. Opening the FTIV vents fuel vapor from the fuel tank to the fuel vapor canister, increasing the canister load, as shown by plot 850. When the fuel tank is vented, the refueling event may proceed.

The systems described herein and shown in FIGS. 1, 2, 3, and 6, along with the methods described herein and depicted in FIGS. 4 and 7 may enable one or more systems and one or more methods. In one example, a system for an engine, comprising: a fuel tank; a thermal regulator comprising a phase-change material, the thermal regulator coupled to the fuel tank; and an engine coolant passage positioned to transfer thermal energy between engine coolant and the phase-change material. The thermal regulator may further comprise the engine coolant passage, which further comprises: an engine coolant inlet; an engine coolant outlet; and channels routed within the thermal regulator coupling the engine coolant inlet and the engine coolant outlet. The engine coolant inlet may be coupled to an engine coolant line downstream of a radiator. The system may further comprise a coolant valve coupled to the engine coolant inlet, the coolant valve configured to selectively allow flow of engine coolant into the engine coolant inlet. In some examples, the thermal regulator may be coupled within the fuel tank, such that the thermal regulator directly contacts fuel disposed within the fuel tank. In some examples, the thermal regulator may be coupled externally to the fuel tank. The thermal regulator may comprise a fuel tank jacket. The fuel tank jacket may be coupled to the fuel tank via fuel tank straps. The technical result of implementing this system is that the temperature of the fuel tank may be managed passively by the phase-change material, and actively by engine coolant, thereby allowing heat energy to be shunted away from the fuel tank, cooling the fuel within the fuel tank, and reducing fuel vapor concentration. In turn, this may enable a fuel vapor canister with a reduced size.

In another example, a method for a vehicle, comprising: during a first condition, circulating engine coolant through a thermal regulator comprising a phase-change material, the thermal regulator coupled to a fuel tank. The first condition may comprise: an engine-on condition; and an ambient temperature above a first threshold. The method may further comprise: during a second condition, circulating engine coolant through a thermal regulator comprising a phase-change material, the thermal regulator coupled to a fuel tank, wherein the second condition comprises: an engine on condition; and an ambient temperature above a second threshold, the second threshold lower than the first threshold. The second condition may further comprise: an engine run time above a threshold; and an engine load above a first engine load threshold. The second condition further comprises: an engine run time below a threshold; and an engine load above a second engine load threshold. Circulating engine coolant through a thermal regulator may further comprise: circulating engine coolant through a thermal regulator disposed within the fuel tank. The technical result of implementing this system is a stable fuel tank temperature during operating conditions where a large amount of heat energy is rejected to the fuel tank. The fuel vapor concentration and fuel tank pressure may thus be maintained or reduced, despite high ambient temperatures, high engine temperature, etc.

A method for a vehicle, comprising: during a first condition, circulating engine coolant through a thermal regulator comprising a phase-change material, the thermal regulator coupled to a fuel tank; and then opening a fuel tank isolation valve. The first condition may comprise a refueling request. The first condition may further comprise: an ambient temperature above a threshold; a bulk fuel temperature above a threshold; and a fuel vapor canister load above a threshold. Circulating engine coolant through a thermal regulator may comprise: circulating engine coolant through a thermal regulator for a duration, the duration based on a quantity of thermal energy that, when transferred to engine coolant from the phase-change material, allows a bulk fuel temperature to decrease below a threshold. The method may further comprise: allowing access to a refueling port responsive to a fuel tank pressure decreasing below a threshold. Circulating engine coolant through a thermal regulator may further comprise: circulating engine coolant through a thermal regulator coupled externally to the fuel tank. The technical result of implementing this system is a reduction of the quantity fuel vapor that must be vented prior to refueling a fuel tank. In this way, the possibility of the fuel vapor canister being overwhelmed by refueling vapors is reduced, thereby potentially reducing bleed emissions. Further, this may enable the usage of a fuel vapor canister with a reduced size.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine, comprising:
   a fuel tank;
   a thermal regulator comprising a phase-change material, the thermal regulator coupled to the fuel tank; and
   an engine coolant passage positioned to transfer thermal energy between an engine coolant and the phase-change material.

2. The system of claim 1, where the thermal regulator further comprises the engine coolant passage, which further comprises:
   an engine coolant inlet;
   an engine coolant outlet; and
   a plurality of channels routed within the thermal regulator coupling the engine coolant inlet and the engine coolant outlet.

3. The system of claim 2, where the engine coolant inlet is coupled to an engine coolant line downstream of a radiator.

4. The system of claim 3, further comprising:
   a coolant valve coupled to the engine coolant inlet, the coolant valve configured to selectively allow flow of engine coolant into the engine coolant inlet.

5. The system of claim 1, where the thermal regulator is coupled within the fuel tank, such that the thermal regulator directly contacts fuel disposed within the fuel tank.

6. The system of claim 1, where the thermal regulator is coupled externally to the fuel tank.

7. The system of claim 6, where the thermal regulator comprises a fuel tank jacket.

8. The system of claim 7, where the fuel tank jacket is coupled to the fuel tank via a plurality of fuel tank straps.

9. A method for a vehicle, comprising:
during a first condition, circulating an engine coolant through a thermal regulator comprising a phase-change material, the thermal regulator coupled to a fuel tank.

10. The method of claim 9, wherein the first condition comprises:
an engine-on condition; and
an ambient temperature above a first threshold.

11. The method of claim 10, further comprising:
during a second condition, circulating engine coolant through a thermal regulator comprising a phase-change material, the thermal regulator coupled to a fuel tank, wherein the second condition comprises:
an engine on condition; and
an ambient temperature above a second threshold, the second threshold lower than the first threshold.

12. The method of claim 11, where the second condition further comprises:
an engine run time above a threshold; and
an engine load above a first engine load threshold.

13. The method of claim 11, where the second condition further comprises:
an engine run time below a threshold; and
an engine load above a second engine load threshold.

14. The method of claim 9, where circulating engine coolant through a thermal regulator further comprises: circulating engine coolant through a thermal regulator disposed within the fuel tank.

15. A method for a vehicle, comprising:
during a first condition, circulating an engine coolant through a thermal regulator comprising a phase-change material, the thermal regulator coupled to a fuel tank; and then
opening a fuel tank isolation valve.

16. The method of claim 15, where the first condition comprises a refueling request.

17. The method of claim 16, where the first condition further comprises:
an ambient temperature above a first threshold;
a bulk fuel temperature above a second threshold; and
a fuel vapor canister load above a third threshold.

18. The method of claim 15, where circulating engine coolant through a thermal regulator comprises:
circulating engine coolant through a thermal regulator for a duration, the duration based on a quantity of thermal energy that, when transferred to engine coolant from the phase-change material, allows a bulk fuel temperature to decrease below a threshold.

19. The method of claim 15, further comprising:
allowing access to a refueling port responsive to a fuel tank pressure decreasing below a threshold.

20. The method of claim 15, where circulating engine coolant through a thermal regulator further comprises: circulating engine coolant through a thermal regulator coupled externally to the fuel tank.

* * * * *